United States Patent [19]

Ono

[11] Patent Number: 4,962,948
[45] Date of Patent: Oct. 16, 1990

[54] PASSIVE SEAT BELT SYSTEM INCORPORATING A GUIDE RAIL AND A SLIDE SHOE

[75] Inventor: Katsuyasu Ono, Yokohama, Japan

[73] Assignee: Nippon Seido Kabushiki Kaisha, Tokyo, Japan

[21] Appl. No.: 314,094

[22] Filed: Feb. 23, 1989

[30] Foreign Application Priority Data

Feb. 24, 1988 [JP] Japan .................................. 63-41025

[51] Int. Cl.⁵ ............................................. B60R 22/06
[52] U.S. Cl. ..................................... 280/804; 16/93 R
[58] Field of Search ....................... 280/804; 297/469; 16/93 R, 93 D

[56] References Cited

U.S. PATENT DOCUMENTS

| | | | |
|---|---|---|---|
| 4,114,945 | 9/1978 | Lutz | 16/93 R |
| 4,241,939 | 12/1980 | Suzuki et al. | 280/804 |
| 4,343,489 | 8/1982 | Suzuki et al. | 280/804 |
| 4,607,863 | 8/1986 | Yokote | 280/804 |
| 4,607,863 | 8/1986 | Yokote | 280/804 |
| 4,708,367 | 11/1987 | Yoshitsugu | 280/804 |
| 4,789,184 | 12/1988 | Saito | 280/804 |
| 4,871,191 | 10/1989 | Ono | 280/804 |

FOREIGN PATENT DOCUMENTS

| | | | |
|---|---|---|---|
| 2585307 | 1/1987 | France | 280/804 |
| 134459 | 8/1986 | Japan | 280/804 |

Primary Examiner—Charles A. Marmor
Assistant Examiner—Karin Tyson
Attorney, Agent, or Firm—Wegner & Bretschneider

[57] ABSTRACT

In a passive seat belt system for a motor vehicle, a slide shoe mounted on a runner is composed of at least a pair of blocks spaced from each other in the direction of movement of the runner, in order to overcome the problem of the varying clearance between the runner and the guide rail. As the runner is moved along the guide rail, the two blocks contact the guide rail at their central portions and, in the meantime, an intermediate portion of the slide shoe is non-engageable with the guide rail. The result is that the slide shoe can contact the guide rail at the same portions even when the posture of the runner is changed due to the change of the curvature of the guide rail and the change of the cross-section shape of the guide rail.

7 Claims, 4 Drawing Sheets

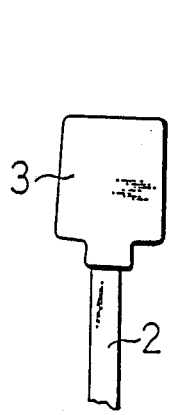
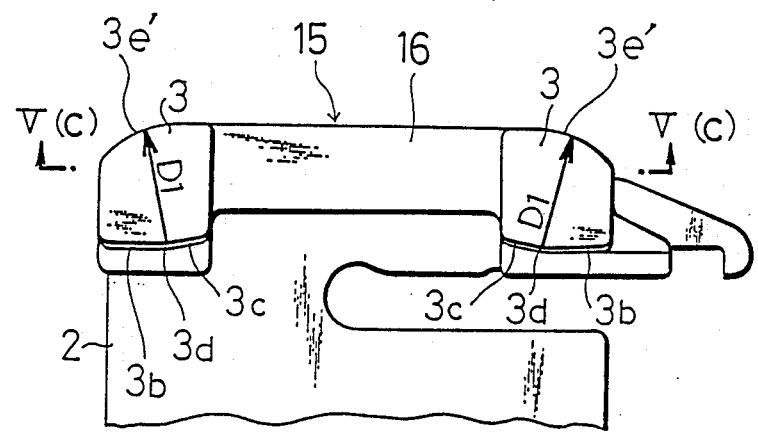
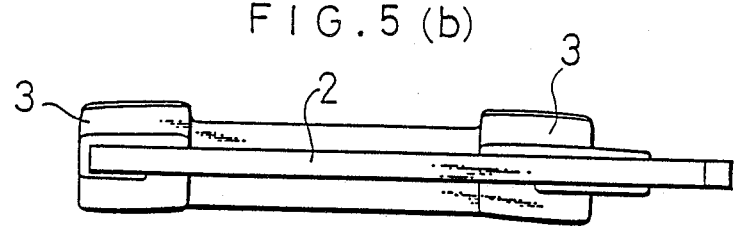
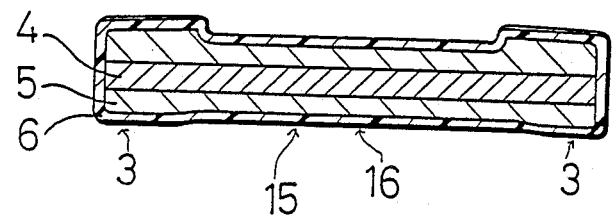

PASSIVE SEAT BELT SYSTEM INCORPORATING A GUIDE RAIL AND A SLIDE SHOE

BACKGROUND OF THE INVENTION

1. Field of the Invention:

The present invention relates to a passive seat belt system for restraining and protecting a seated person in a motor vehicle in an emergency such as a collision. More particularly, the invention relates to a movable anchor or so-called runner of the passive seat belt system.

2. Description of the Related Art:

Various passive seat belt systems are known which generally comprise a guide rail mounted on an interior part of a motor vehicle body, a runner slidably supported on the guide rail, and a webbing connected to the runner. The runner is driven by a suitable drive means such as a motor for movement between an occupant-restraining position and an occupant-releasing position so that the webbing can protect an occupant, i.e., a seated person by automatically restraining the seated person in an emergency such as a collision.

A typical seat belt system of the described type is illustrated in FIG. 6 of the accompanying drawings, in which a webbing 7 is connected to a runner 2 via an anchor plate 8 and a connecting pin 9, the runner 2 being movable along a guide rail 1.

For smooth sliding on the guide rail 1, the runner 2 has a contact portion 11 engaging with the guide rail 1. The contact portion has been molded with a synthetic resin or the like and has a small degree of coefficient of friction. Such a contact portion is commonly called "slide shoe". As shown in FIG. 6, the known slide shoe 11 has a substantially arcuate contour extending generally in the direction of movement of the runner 2.

The guide rail 1 has a shape conforming substantially with a corresponding part of the contour of a vehicle door and hence includes portions ranging from a straight form to a curved form having a radius of curvature of about 70 mm. As the arcuate slide shoe 11 moves in and along the guide rail 1 which has a varying radius of curvature, the gap or clearance between the slide shoe 11 and the guide rail 1 varies sharply.

At a straight portion of the guide rail 1, as shown in FIG. 6, the clearance between the slide shoe 11 and the guide rail 1 is small. In a curved portion of the guide rail 1, as shown in FIG. 7, the clearance becomes relatively large. This wide clearance change causes the slide shoe 11 to contact the guide rail 1 at different portions and hence with a varying degree of frictional resistance. With this conventional arrangement, the runner 2 tends to jolt when it is moved along the guide rail 1. Consequently, stable and smooth guiding of the runner is difficult to achieve.

Another problem with the conventional arrangement is that since the guide rail 1 is produced by bending an initially straight extrusion-molded blank member, the cross-sectional shape of such a single rail varies along its length. This change of the cross-sectional shape causes the posture of the runner 2 to change, which in turn causes the slide shoe 3 to contact the guide rail 1 at different portions and with a varying degree of frictional resistance. In this case, it is difficult to guide the runner 2 smoothly along the guide rail.

SUMMARY OF THE INVENTION

It is therefore desired to provide a passive seat belt system in which a slide shoe can contact a guide rail at the same portions even when the posture of a runner is changed due to the change of the radius of curvature of the guide rail and the change of the cross-sectional shape of the guide rail.

In a passive seat belt system according to the present invention, a slide shoe mounted on a runner is composed of at least a pair of blocks spaced from each other in the direction of movement of the runner, in order to overcome the problem of the varying clearance between the runner and the guide rail. As the runner is moved along the guide rail, the two blocks contact the guide rail by their respective central portions and, in the meantime, an intermediate portion of the slide shoe is not engageable with the guide rail.

Further, in order to eliminate the change of contacting portions of the slide shoe, each of the blocks has a generally parallelogram or trapezoidal cross section.

With such slide shoe of the runner, the clearance between the guide rail and the slide shoe can be kept constant, irrespective of the shape of the guide rail, i.e. either straight or curved. Further, the substantially same portion of the slide shoe can frictionally contact the guide rail as the slide shoe slides on the guide rail along the length thereof, thus causing a substantially constant degree of frictional resistance.

Many other advantages, features and additional objects of the present invention will become manifest to those versed in the art upon making reference to the detailed description and the accompanying drawings in which several preferred structural embodiments incorporating the principles of the present invention are shown by way of illustrative example.

BRIEF DESCRIPTION OF THE DRAWINGS

FIG. 2 shows an end block with a smallest dimensional tolerance and a guide rail with a greatest dimensional tolerance, while FIG. 3 depicts an end block with a greatest dimensional tolerance and a guide rail with a smallest dimensional tolerance;

FIG. 5(a) is a view similar to FIG. 4(a), showing a third embodiment, in which a pair of blocks of the slide shoe are separated by an intermediate portion having a reduced cross-section;

FIG. 5(b) is a side elevational view of the runner of FIG. 5(a);

FIG. 5(c) is a vertical cross-sectional view taken along line V(c)-V(c) of FIG. 5(a);

FIG. 5(d) is an end view of the runner of FIG. (a)

DETAILED DESCRIPTION

The principles of the present invention are particularly useful when embodied in a passive seat belt system especially for a motor vehicle.

Figure 1:
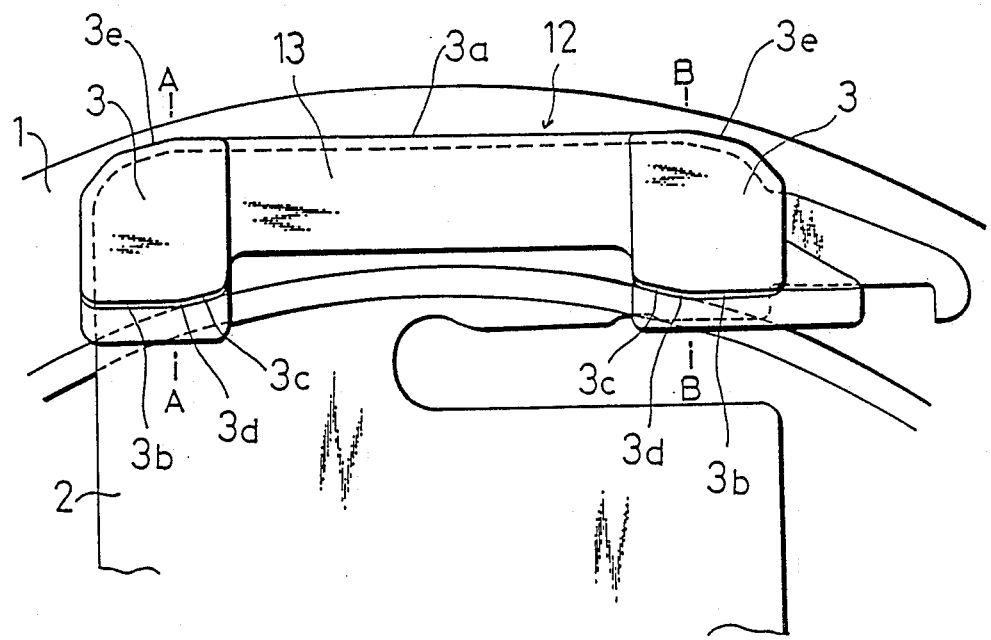
FIG. 1 is a fragmentary plan view of a passive seat belt system according to a first embodiment of the present invention, showing a runner and its associated parts.
Figure 6:
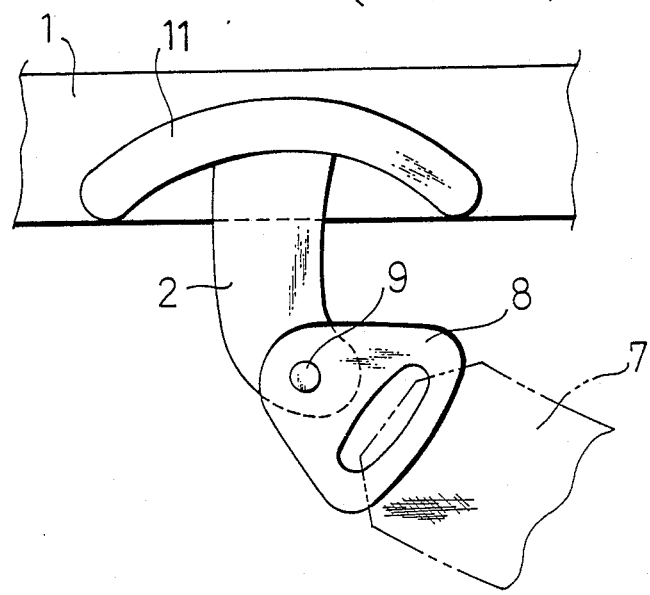
FIGS. 6 and 7 show an arcuate slide shoe of the conventional art.
Figure 7:
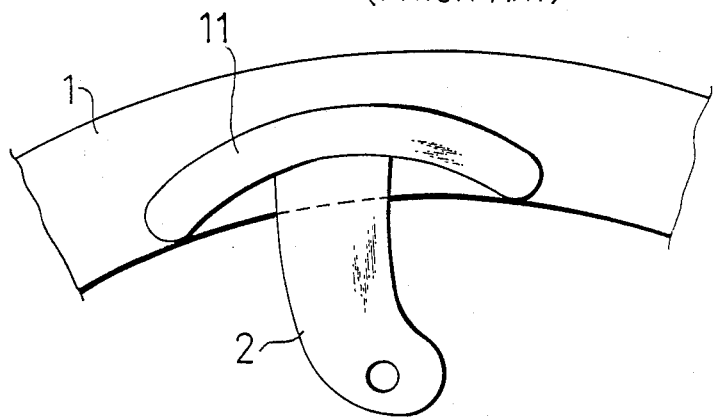

FIG. 1 illustrates a portion of a passive seat belt system according to a first embodiment of the present invention. In the passive seat belt system, a movable anchor or runner (hereinafter called "runner") 2 has one end to which a webbing or seat belt strap (not shown) is connected in the known manner shown in FIG. 6, and another end on which a slide shoe 12 has been molded with a synthetic resin. As the runner 2 is driven, by a suitable drive means such as a motor (not shown), to move along the guide rail 1, the slide shoe 12 slides in contact with the inside wall of the guide rail 1 between a first position in which the unillustrated webbing may restrain an occupant or seated person (hereinafter called "seated person") in a manner known per se in the art and a second position in which the webbing may release the seated person.

Figures 2, 3:
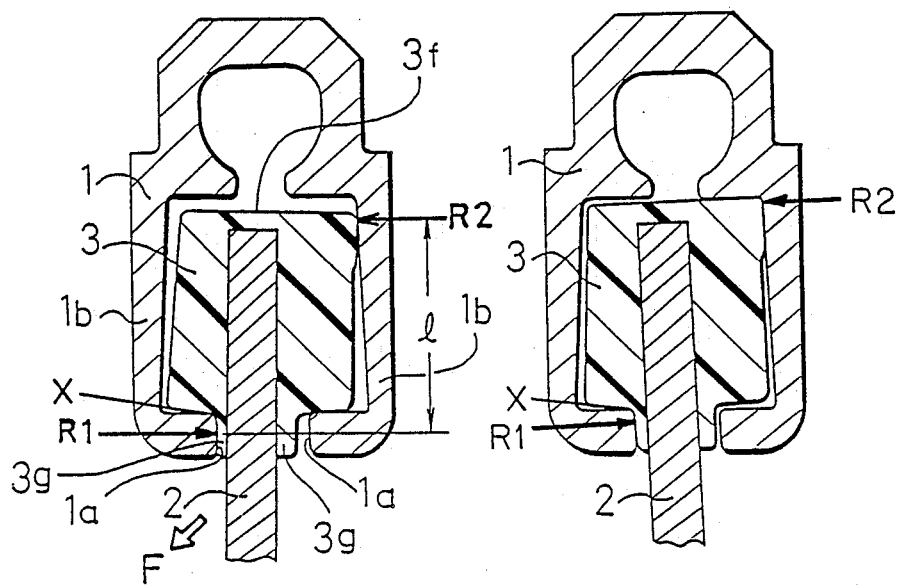
FIGS. 2 and 3 are transverse cross-sections corresponding to a view taken along line A—A or B—B of FIG. 1, more specifically.

The slide shoe 12 is composed of a pair of spaced end blocks 3 engageable with the guide rail 1 and a connecting intermediate portion 13 extending between the end blocks 3,3 and non-engageable with the guide rail 1. FIG. 1 shows the runner 2 passing through a curved portion of the guide rail 1. Only the opposite end blocks 3,3 of the slide shoe 12 are in contact with the guide rail 1, and the remaining portions of the slide shoe 12 is out of contact with the guide rail 1. FIGS. 2 and 3 show in detail the manner in which the respective end blocks 3,3 contact the inside walls of the guide rail 1.

More specifically, the slide shoe 12 has a top 3a disposed on a side most remote from the webbing-connecting end of the runner 2 extending rectilinearly substantially in the direction of movement of the runner 2. On the other hand, the slide shoe 12 has a pair of bottom projections on a side closer to the webbing-connecting end of the runner 2. Each of the bottom projections has a level portion 3b extending substantially parallel to the top 3a, an inner slope portion 3c extending from the inner end of the level portion 3b in such a direction that an imaginary extension of the inner slope portion 3c crosses an imaginary extension of the inner slope portion 3c of the other bottom projection on a side of the top 3a, and a corner portion 3d at which the level portion 3b and the inner slope portion 3c meet.

The two level portions 3b, 3b are slightly inclined, with respect to the direction of movement of the runner 2, in such a direction that imaginary extensions of these two level portions 3b, 3b cross each other on a side closer to the webbing-connecting end of the runner 2 so that the slide shoe 12 can contact the guide rail 1 about the corner portions 3d, 3d. With this structural feature, the runner 2 can pass the straight portion of the guide rail 1 smoothly.

Further, the two inner slope portions 3c, 3c are inclined with respect to the top 3a at such an angle that the slide shoe 12 contacts the guide rail 1 only about the corner portions 3d, 3d even when the runner 2 passes a curved portion of the guide rail 1, the curvature of which portion is maximum. This structural feature allows the runner 2 to pass the curved portion of the guide rail 1 smoothly.

In addition, the slide shoe 12 has a pair of outer slope portions 3e, 3e disposed contiguous to the top 3a and extending parallel to the corresponding inner slope portions 3c, 3c. The distance between each outer slope portion 3e and the corresponding inner slope portion 3c is substantially equal to the distance between the top 3a and the individual level portions 3b, 3b.

With the construction described above, each bottom projection of the slide shoe 12 is always kept in contact with the guide rail 1 about the corner portion 3d whether the runner 2 passes the straight portion or the curved portion of the guide rail 1. In the meantime, the clearance between the slide shoe 12 and the guide rail 1 also can be kept constant at both the straight portion and the curved portion of the guide rail 1.

FIGS. 2 and 3 are cross-sectional views taken along lines A—A and B—B, respectively, of FIG. 1. In FIG. 2, the size of the guide rail 1 is large, and the size of the end block 3 is small; therefore, the runner 2 tends to jolt in the guide rail 1 most violently. In FIG. 3, unlike FIG. 2, the runner 2 may jolt least violently.

As shown in FIGS. 2 and 3, when the runner 2 is pulled in the direction of an arrow F, namely, toward the interior side of the vehicle body, the slide shoe 12 and the guide rail 1 are brought into contact with each other at points where reaction forces R1, R2 act. The parallelogram or trapezoidal cross-sectional shape of the slide shoe 12 is such that the span or distance l between the point where the reaction force R1 acts and the point where the reaction force R2 acts will be kept maximum anytime when the pulling force in the direction of the arrow F is exerted on the runner 2.

As is apparent from FIGS. 2 and 3, the parallelogram or trapezoidal shape of each of the opposite end blocks 3, 3 is such that the bottom side projects toward the webbing-connecting end of the runner 2, namely, the seated person, while the top side 3f projects toward the outside of the vehicle body. Thus the top side 3f of the individual end block 3 may be brought into contact with the guide rail 1.

On the bottom side, each end block of the slide shoe 12 has a pair of extensions 3g, 3g engageable with the respective free ends (described below) 1a, 1a of the guide rail 1 so that the bottom corner of the parallelogram is prevented from contacting the guide rail 1.

The guide rail 1 has a generally inverted U-shaped cross-section, having a pair of opposite free ends 1a, 1a directed toward each other, and a pair of side walls 1b, 1b spaced apart by a varying distance progressively increasing toward the free ends 1a, 1a.

These structural features allow the portions other than the contact portions to escape in order to avoid any contact between the unnecessary portions. Thus the portions to be engaged are definitely distinguished from the portions not to be engaged; the change of span between the points where reaction forces R1, R2 occur is thereby stabilized to reduce both the change of the contact pressure and the change of the frictional resistance to a minimum.

Figure 4A:
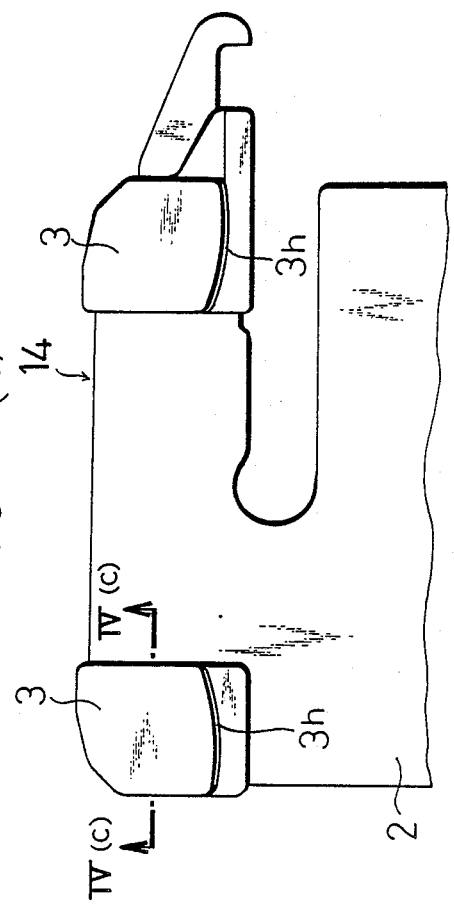
FIG. 4(a) is a fragmentary plan view of a modified runner according to a second embodiment, in which a slide shoe is composed of a pair of spaced and molded blocks.
Figure 4B:
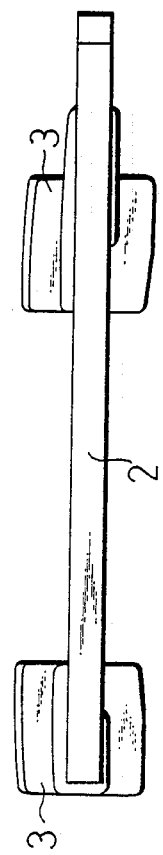
FIG. 4(b) is a side elevational view of the runner of FIG. 4(a)
Figure 4D:
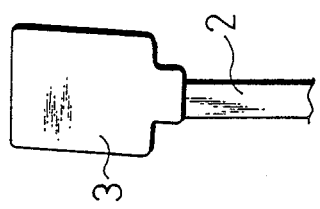
FIG. 4(d) is an end view of the runner of FIG. 4(a)
Figure 4C:
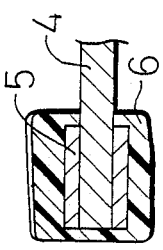
FIG. 4(c) is a vertical cross-sectional view taken along line IV(c)-IV(c) of FIG. 4(a)

FIGS. 4(a), 4(b), 4(c) and 4(d) illustrate a second embodiment of the present invention, in which a modified slide shoe 14 is composed of only a pair of end blocks 3, 3 molded on one end of the runner 2 remotely from the webbing-connecting end and spaced from each other in the direction of movement of the runner 2. As shown in FIG. 4(c), each end block 3 has been formed by covering an iron plate 4 of the runner 2 with a die-cast layer 5 and then by covering the die-cast layer 5 with a molded layer 6 of synthetic resin. Between the pair of end blocks 3, there exists only the iron plate 4, which is to escape, i.e., not to be brought into contact with the guide rail. In this embodiment, unlike the first embodiment, each end block 3 of the slide shoe 14 has an arcuate bottom surface 3h.

With this arrangement, the runner 2 is maintained in contact with the guide rail at both the end blocks 3, 3, and only the intermediate portion of the runner 2 is not engageable the guide rail. The end blocks 3, 3 have a substantially parallelogram or trapezoidal cross-sectional shape, as viewed in the direction of movement of the runner 2 (FIG. 4(d)), with an extension projecting toward the webbing-connecting end of the runner 2. Having this parallelogram or trapezoidal shape, the end blocks 3, 3 can contact the guide rail at constant points to minimize the change of the contact pressure and also the change of the frictional resistance, thus ensuring smooth sliding of the runner 2 along the entire length of the guide rail.

FIGS. 5(a), 5(b), 5(c) and 5(d) illustrate a third embodiment of the present invention, in which a modified slide shoe 15 is mounted on one end of the runner 2 remotely from the webbing-connecting end. As shown in FIG. 5(c), the slide shoe 15 includes a pair of end blocks 3, 3 connected to each other by a bottle-necked intermediate portion 16 which is to escape, namely, not to be engaged with the guide rail. This slide shoe 15 has been formed by covering the iron plate 4 (of the runner 2) with a die-cast layer 5 and then by covering the die-cast layer 5 with a molded layer 6 of a synthetic resin. In this embodiment, unlike the first embodiment, the outer slope portion 3e' of each end block 3 is an arc having a radius of curvature D1 about the corresponding corner portion 3d. The end block 3, 3 of the slide shoe 15 also have a substantially parallelogram or trapezoidal cross-sectional shape as those of the first and second embodiments and hence produces the similar results.

As mentioned above, according to the present invention, because the clearance between the guide rail and the slide shoe of the runner is kept constant, irrespective of the curvature of the individual curved portions of the guide rail, the runner is free from jolting and can slide smoothly along the guide rail. Further, since the contact pressure created between the guide rail and the slide shoe, as the webbing is twisted of forcibly pulled interiorly of the vehicle body, is also kept non-changeable, an improved smoothness of movement of the runner can be achieved.

As a consequence, it is possible to realize a passive seat belt system which can work reliably, without giving any unpleasant feeling to an occupant or seated person, as the runner slides along the guide rail with smoothness.

It will be understood that various changes in the details, material, and arrangements of parts, which have been herein described and illustrated in order to explain the nature of the invention, may be made by those versed in the art within the principles and scope of the invention as recited in the appended claims.

What is claimed is:

1. A passive seat belt system comprising:
   (a) a guide rail;
   (b) a runner movable along said guide rail;
   (c) a webbing connected to one end of said runner, said runner being movable between a first position in which said webbing may restrain a seated person and a second position in which said webbing may release the seated person; and
   (d) a slide shoe mounted on said runner and contacting said guide rail so that said runner is slidable on said guide rail, and slide shoe having a top which is disposed on a side most remote from said one end of said runner in a direction perpendicular to the direction of movement of said runner and extends in the direction of movement of said runner, said slide shoe further having a pair of bottom projections on a side closer to said one end of said runner, wherein each of said bottom projections has a level portion extending substantially parallel to said top, an inner slope portion extending from said level portion in such a direction that an imaginary extension of said inner slope portion of one of the bottom projections crosses that of the inner slope portion of the other bottom projection on a side of said top, and a corner portion at which said level portion and said inner slope portion meet, wherein said level portion is slightly inclined, with respect to the direction of movement of said runner, in such a direction that an imaginary extension of one level portion on a side closer to said one end of said runner.

2. A passive seat belt system according to claim 1, in which said slide shoe further has a pair of outer slope portions contiguous to said top and extending substantially parallel to said inner slope portions, respectively.

3. A passive seat belt system according to claim 1, in which said slide shoe further has a pair of outer slope portions contiguous to said top and extending arcuately about said corner portions, respectively.

4. A passive seat belt system according to claim 1, in which said slide shoe includes a pair of blocks molded on said runner and spaced from each other in the direction of the movement of said runner.

5. A passive seat belt system for a motor vehicle, comprising:
   (a) a guide rail adapted to be mounted on a body of the motor vehicle;
   (b) a runner movable along said guide rail;
   (c) a webbing connected to one end of said runner, said running being movable between a first position in which said webbing may restrain a seated person and a second position in which said webbing may release the seated person; and
   (d) a slide shoe mounted on said runner and contacting said guide rail so that said runner is slidable on said guide rail, said slide shoe having a substantially rhomboid or trapezoidal cross-sectional shape, with a top side of said slide shoe projecting toward the body of the motor vehicle and a bottom side of said slide shoe projecting toward an interior of the motor vehicle, as viewed in the direction of movement of runner.

6. A passive seat belt system for a motor vehicle, comprising:
   (a) a guide rail adapted to be mounted on a body of the motor vehicle;
   (b) a runner movable along said guide rail;
   (c) a webbing connected to one end of said runner, said runner being movable between a first position in which said webbing may restrain a seated person and a second position in which said webbing may release the seated person; and
   (d) a slide shoe mounted on said runner and contacting said guide rail so that said runner is slidable on said guide rial, said slide shoe having a substantially parallelogram or trapezoidal cross-sectional shape, with a top side of said slide shoe projecting toward the body of the motor vehicle and a bottom side of said slide shoe projecting toward an interior of the motor vehicle, as viewed in the direction of movement of runner;

wherein said guide rail has a generally inverted U-shaped cross-section and has a pair of side walls with opposite free ends direction toward each other, wherein a distance between inner surfaces of the pair of side walls progressively increases toward the opposite free ends, and wherein outer surfaces of the pair of side walls are parallel to each other.

7. A passive seat belt system for a motor vehicle, comprising:

(a) a guide rail adapted to be mounted on a body of the motor vehicle;

(b) a runner movable along said guide rail;

(c) a webbing connected to one end of said runner, said runner being movable between a first position in which said webbing may restrain a seated person and a second position in which said webbing may release the seated person; and (d) a slide shoe mounted on said runner and contacting said guide rail so that said runner is slidable on said guide rail, said slide shoe having a substantially parallelogram or trapezoidal cross-sectional shape, with a top side of said slide shoe projecting toward the body of the motor vehicle and a bottom side of said slide shoe projecting toward an interior of the motor vehicle, as viewed in the direction of movement of runner, wherein said slide shoe has a pair of extensions projecting from a bottom side of the parallelograms or trapezoidal shape and engageable with the respective free ends of said guide rail.

* * * * *